June 6, 1939.  B. G. JOHNSON  2,161,578
DIE TRUCK
Filed Nov. 5, 1937   2 Sheets-Sheet 1

INVENTOR.
Bernard G. Johnson
BY James R. McKnight
ATTORNEY.

June 6, 1939.  B. G. JOHNSON  2,161,578
DIE TRUCK
Filed Nov. 5, 1937  2 Sheets-Sheet 2

INVENTOR.
Bernard G. Johnson
BY James R. McKnight
ATTORNEY.

Patented June 6, 1939

2,161,578

UNITED STATES PATENT OFFICE 2,161,578

DIE TRUCK

Bernard G. Johnson, Brookfield, Ill.

Application November 5, 1937, Serial No. 172,978

1 Claim. (Cl. 311—39)

Among the objects of my invention is to create a die truck having an overhead construction for separating, rotating and assembling heavy leader pin die sets; to create a die truck having an adjustable table so as to avoid the heavy lifting of dies and heavy machine parts; to supply a die truck movable to any part of the factory and usable where ever moved as a practical work bench; to supply a die truck which will eliminate industrial hazards and by its convenience and speed, cut operating costs and such other objects, advantages, and capabilities as will later more fully appear and which are inherently possessed by my invention.

While I have shown in the accompanying drawings a preferred embodiment of my invention, yet I wish it understood that the same is susceptible of modification and change without departing from the spirit of my invention.

Figure 1:
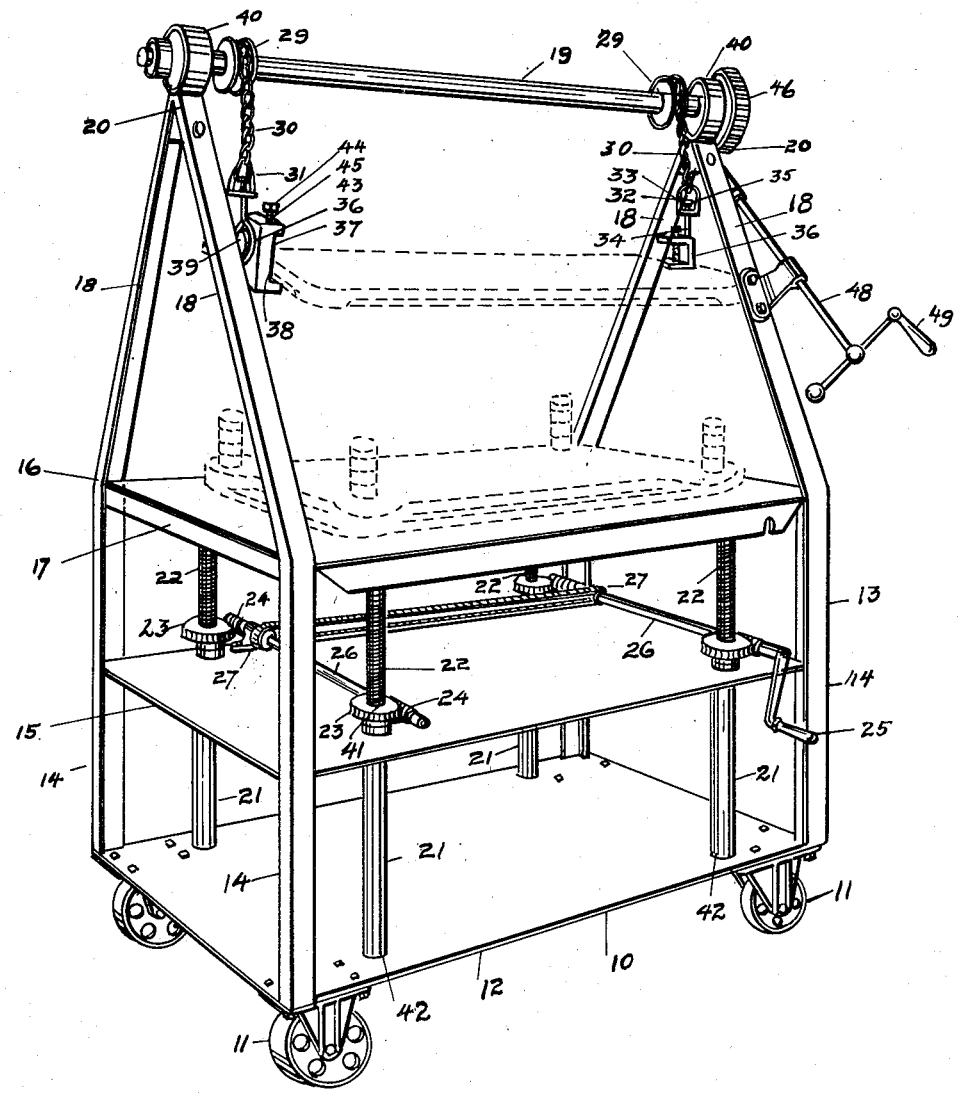
Figure 2:
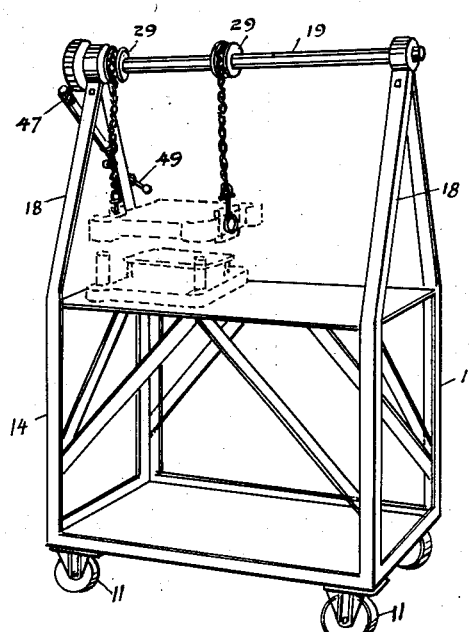
Figure 4:
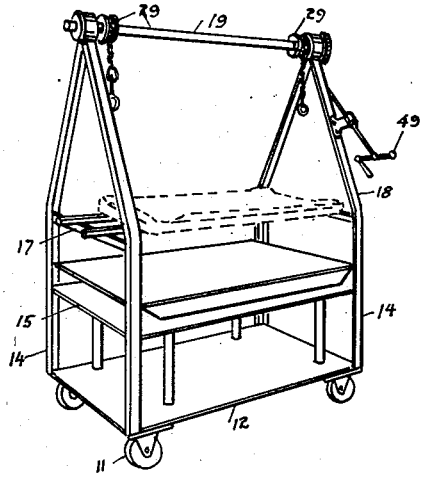
Figure 3:
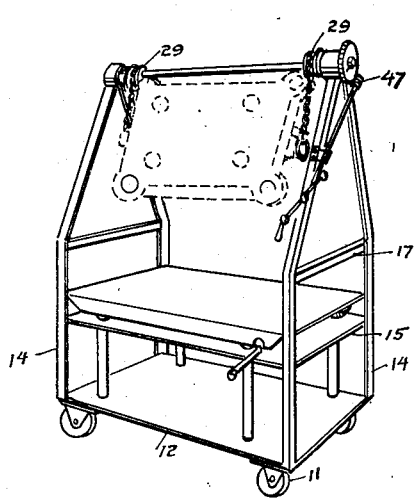

Referring to the drawings, Figs. 1 and 2 are perspective views of preferred embodiments of my invention; Fig. 3 is a perspective view of my die showing the top table in lowered position, and Fig. 4 is a perspective view showing the use of parallel bars on cross members 17.

The embodiment selected to illustrate my invention comprises a truck 10 having a plurality of casters 11, preferably four, attached by suitable means such as rivets or electric welding adjacent each of the four corners of a base 12.

A frame 13 preferably consists of a plurality of upright portions 14, the lower ends of which are attached by electric welding or the like, to the upper face of the base 12 adjacent each of the corners thereof. The upright members 14 extend upwardly beyond an intermediate table 15 to substantially the normal level of a top table 16. A cross member 17 extends between each of the upright portions 14 at the ends of the truck as shown in Fig. 1. Each pair of members 14 on opposite ends of the truck continues upwardly and inwardly as converging portions 18 meeting at their top portions 20 to form a support for bearing 40. An overhead shaft 19 extends between and is supported by oppositely disposed bearings 40.

A plurality of spaced tubes 21 have their lower ends welded to the top surface of base 12 and their upper ends welded to the intermediate table 15.

A plurality of spaced screws 22 have their upper ends attached to the under side of top table 16 and extend downwardly to intermediate table 15 when in normal position. Each screw 22 is surrounded by a worm wheel 23. Operable on each of said worm wheels is a worm gear 24. A handle 25 is turnable to operate the worm gears and worm wheels through shafts 26 and chain and sprockets 27.

Upon operation of the handle 25 the top table 16 may be lowered toward the intermediate table 15, and raised as desired. Upon the lowering of the top table 16 the screws 22 pass through openings 41 in the intermediate table 15 into tubes 21 and, if the top table 16 is lowered sufficiently, the screws 22 will descend through tubes 21 and openings 42 in base 12. Table 16 does not overlie crosspieces 17 but merely extends nearly to crosspieces 17. Therefore table 16 can be raised and lowered and is adjustable.

A pair of spools 29 are slidably mounted on overhead shaft 19. To each of said spools 29 is attached at its inner end a chain, cable or length of suitable material 30. To the outer end of each chain 30 is attached a yoke 31 having a substantially centrally located aperture 32 in its bottom portion 33. Through said aperture 32 extends a screw threaded eye bolt 34 having an adjusting nut 35. Integral with and extending from the eye bolt 34 is a loop or hook 36.

A pair of removable clamping members 37 each are formed with a substantially U-shaped body portion 38 and substantially at right angles thereto a knob 39. At the top 43 of the body portion 38 is a threaded aperture 44 into which screws a set screw 45.

Adjacent the outer side of one of the bearings 40 a worm wheel 46 is suitably attached to the overhead shaft 19. A worm gear 47 is positioned to actuate said worm wheel 46 upon movement of shaft 48 by operation of handle 49.

My die truck is particularly useful wherever heavy die sets are to be separated or assembled. Heretofore it was necessary to employ several men. With my die truck the top table may be adjusted to the proper height of the place from which the die set is to be removed, so that the transfer to the truck may be accomplished with a minimum of effort and at considerable speed. If it is desired to lift the punch holder the clamping members 37 are positioned on either side of the punch holder; the set screws 45 are tightened; the loops 36 are placed around the knobs 39 and the handle 49 is operated to raise the punch holder. The punch holder may also be rotated so as to contact and see all parts thereof.

The die shoe lying on the top table may be raised or lowered by operating handle 25, so that there is plenty of space for examination and work by one worker on both punch holder and die shoe at the same time with the use of a single die truck.

Cross members 17 are adapted to receive parallel bars, upon which the user may place a desired object such as a punch holder for examination and work.

Another embodiment of my invention shown in Fig. 2 omits the intermediate table 15 and its raising and lowering mechanism, but is otherwise substantially the same die truck as shown in Fig. 1.

Having thus described my invention, I claim:

In a portable table construction a fixed bottom table, a plurality of spaced tubes having their lower ends attached to the upper surface of said bottom table, a fixed intermediate table, the upper ends of said spaced tubes attached to the under surface of said intermediate table and supporting said intermediate table in spaced relation to said bottom table, a movable top table, a plurality of spaced screws having their upper ends attached to the under surface of said top table, said screws extending downwardly to said intermediate table when the top table is normally spaced from said intermediate table, a worm wheel surrounding and attached to each of said screws, a worm gear positioned to contact each of said worm wheels, means for operating said worm gears and in turn said worm wheels for raising and lowering said screws, said screws positioned so that when said screws are lowered said screws enter said spaced tubes so that said top table may be lowered with relation to the fixed intermediate table, a frame having a plurality of uprights with their lower ends attached to the upper surface of said lower table adjacent the corners thereof, said uprights extending vertically beyond the intermediate table to substantially the normal level of the top table and cross members attached to each pair of uprights at the upper ends thereof so that when the table is below normal level, the cross members may hold objects placed thereacross.

BERNARD G. JOHNSON.